(12) United States Patent
Sano et al.

(10) Patent No.: US 10,796,850 B2
(45) Date of Patent: Oct. 6, 2020

(54) METALIZED FILM AND FILM CAPACITOR

(71) Applicant: Panasonic Intellectual Property Management Co., Ltd., Osaka (JP)

(72) Inventors: Masahito Sano, Shimane (JP); Taiyou Tsukahara, Toyama (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 3 days.

(21) Appl. No.: 15/990,998

(22) Filed: May 29, 2018

(65) Prior Publication Data

US 2018/0277304 A1 Sep. 27, 2018

Related U.S. Application Data

(63) Continuation of application No. PCT/JP2016/005021, filed on Nov. 30, 2016.

(30) Foreign Application Priority Data

Dec. 15, 2015 (JP) .................................. 2015-244057

(51) Int. Cl.
*H01G 4/18* (2006.01)
*H01G 4/32* (2006.01)
(Continued)

(52) U.S. Cl.
CPC ............ *H01G 4/015* (2013.01); *H01G 4/012* (2013.01); *H01G 4/145* (2013.01); *H01G 4/18* (2013.01); *H01G 4/32* (2013.01)

(58) Field of Classification Search
CPC .......... H01G 4/015; H01G 4/012; H01G 4/32; H01G 4/145; H01G 4/18; H01G 9/048; H01G 2009/0416; H01G 2009/0412
See application file for complete search history.

(56) References Cited

U.S. PATENT DOCUMENTS 6,631,068 B1 * 10/2003 Lobo ...................... H01G 2/16
361/273
7,933,111 B2 * 4/2011 Yang ....................... H01G 2/16
361/273
(Continued)

FOREIGN PATENT DOCUMENTS

CN 1187678 A 7/1998
CN 102683008 9/2012
(Continued)

OTHER PUBLICATIONS

International Search Report of PCT application No. PCT/JP2016/005021 dated Feb. 14, 2017.
(Continued)

*Primary Examiner* — Nathan Milakovich
(74) *Attorney, Agent, or Firm* — McDermott Will & Emery LLP

(57) ABSTRACT

A metalized film includes a dielectric film having a strip-shape, and a metal vapor-deposited electrode. An insulation margin is provided on a first end portion located at one end in a width direction of the dielectric film. A plurality of first slits each extending in a longitudinal direction of the dielectric film and a plurality of fuses are provided close to a second end portion located at an other end in the width direction. The metal vapor-deposited electrode includes a plurality of divided electrodes separated by a corresponding one of a plurality of second slits. Each of the plurality of second slits extends from the insulation margin to a corresponding one of the plurality of first slits. When the metalized film is cut along a cutting line extending in the width direction, at least two divided electrodes among the plurality of divided electrodes are respectively cut at the cutting line.

5 Claims, 5 Drawing Sheets

(51) Int. Cl.
*H01G 4/012* (2006.01)
*H01G 4/14* (2006.01)
*H01G 4/015* (2006.01)

(56) References Cited

U.S. PATENT DOCUMENTS

2019/0172650 A1* 6/2019 Sano ................. H01G 4/015
2019/0237253 A1* 8/2019 Sano ................. H01G 4/306
2020/0203078 A1* 6/2020 Sano ................. H01G 4/008

FOREIGN PATENT DOCUMENTS

| CN | 202695134 U | * | 1/2013 | |
|---|---|---|---|---|
| JP | 4-245612 | | 9/1992 | |
| JP | 2009-170685 | | 7/2009 | |
| JP | 2009170685 A | * | 7/2009 | ............... H01G 4/32 |

OTHER PUBLICATIONS

English Translation of Chinese Search Report dated May 22, 2019 for the related Chinese Patent Application No. 201680072554.X.

* cited by examiner

METALIZED FILM AND FILM CAPACITOR

RELATED APPLICATIONS

This application is a continuation of the PCT International Application No. PCT/JP2016/005021 filed on Nov. 30, 2016, which claims the benefit of foreign priority of Japanese patent application No. 2015-244057 filed on Dec. 15, 2015, the contents all of which are incorporated herein by reference.

BACKGROUND

1. Technical Field

The present disclosure relates to a metalized film capacitor used for various kinds of electronic devices, electric devices, industrial devices, vehicles or the like and a metalized film used for manufacturing the metalized film capacitor.

2. Description of the Related Art

In general, film capacitors are roughly categorized into those having electrodes made of metallic foil and those having electrodes made of films shaped or lump shaped metal formed by vapor deposition (hereinafter referred to as vapor-deposited metal) on dielectric films. A film capacitor which uses a so-called metalized film having vapor-deposited metal on a dielectric film has been widely used because of the following reasons. One of the reasons is that the vapor-deposited metal electrode takes up less space in the film capacitor than the metallic foil electrode in the film capacitor, and thus film capacitors having the vapor-deposited metal electrodes allow reduction in both size and weight. The other reason is high reliability in resistance to dielectric breakdown owing to the self-healing properties of vapor-deposited electrodes (which, in the event of a short circuit at a defective insulation site, allow the vapor-deposited electrode around the defective site to evaporate or disperse by short-circuit current energy and get insulated again, and thereby enabling the capacitor to recover functionality).

The configuration of a conventional metalized film is described with reference to FIG. 4. FIG. 4 is a top plan view illustrating the conventional metalized film (see Unexamined Japanese Patent Publication No. 4-245612).

As shown in FIG. 4, metalized film 80 is formed by forming metal vapor-deposited electrode 89 made of vapor-deposited metal on a surface of a dielectric film 81.

Strip-shaped insulation margin 82 where vapor-deposited metal does not exist is formed in one end portion of metalized film 80 so as to extend in a longitudinal direction of metalized film 80. Strip-shaped first slit 83 where vapor-deposited metal does not exist is formed on the other end portion side of metalized film 80 so as to extend in the longitudinal direction of metalized film 80. Due to the formation of first slit 83, metal vapor-deposited electrode 89 is divided into first electrode 85 disposed on the other end portion side of metalized film 80, and second electrode 90 disposed on one end portion side of metalized film 80 with respect to first electrode 85.

Second electrode 90 is divided into divided electrodes 86 arranged in a longitudinal direction of metalized film 80, which are separated by second slit 84 formed so as to extend in a width direction of metalized film 80 from insulation margin 82 to first slit 83. Each of these divided electrodes 86 is connected to first electrode 85 through fuse 87 formed between first slits 83.

With such a configuration, in case that a defective insulation site of dielectric film 81 on which divided electrode 86 is formed is broken, fuse 87 is shut down due to an electric current which flows into divided electrode 86. Thus, divided electrode 86 in which defective insulation site exists is electrically separated, so that short circuiting or firing is prevented. In other words, the metalized film can have a self-protecting function.

SUMMARY

A metalized film according to the present disclosure includes a dielectric film having a strip-shape, and a metal vapor-deposited electrode which is formed on a surface of the dielectric film and contains vapor-deposited metal. An insulation margin where vapor-deposited metal does not exist is provided on a first end portion of the dielectric film. The first end portion is located at one end in a width direction of the dielectric film. The insulation margin has a strip-shape that extends in a longitudinal direction of the dielectric film. A plurality of first slits where vapor-deposited metal does not exist and a fuse disposed between a corresponding pair of the plurality of first slits are provided close to a second end portion of the dielectric film. The second end portion is located at the other end in the width direction of the dielectric film, The plurality of first slits each have a strip-shape that extends in the longitudinal direction of the dielectric film. The metal vapor-deposited electrode has a first electrode and a second electrode. The first electrode is disposed at a side close to the second end portion with respect to the plurality of first slits. The second electrode is disposed at a side close to the first end portion with respect to the plurality of first slits. The second electrode includes a plurality of divided electrodes separated by a corresponding one of a plurality of second slits where the vapor-deposited metal does not exist, and are arranged in the longitudinal direction. Each of the plurality of second slits is extending from the insulation margin to a corresponding one of the plurality of respective first slits. Each of the plurality of divided electrodes is connected to the first electrode through the fuse. When the metalized film is cut along a cutting line extending in the width direction, at least two divided electrodes among the plurality of divided electrodes are respectively cut into pieces at the cutting line. The at least two divided electrodes are arranged in the longitudinal direction.

With such a configuration, the metalized film where the occurrence of a crack in the fuse is suppressed can be obtained. The film capacitor which uses such a metalized film can possess a self-protecting function exhibiting a highly accurate fuse operation.

DETAILED DESCRIPTION OF EMBODIMENT

Prior to describing an exemplary embodiment of the present disclosure, problems with a conventional metalized film capacitor will be briefly described.

Figure 5:
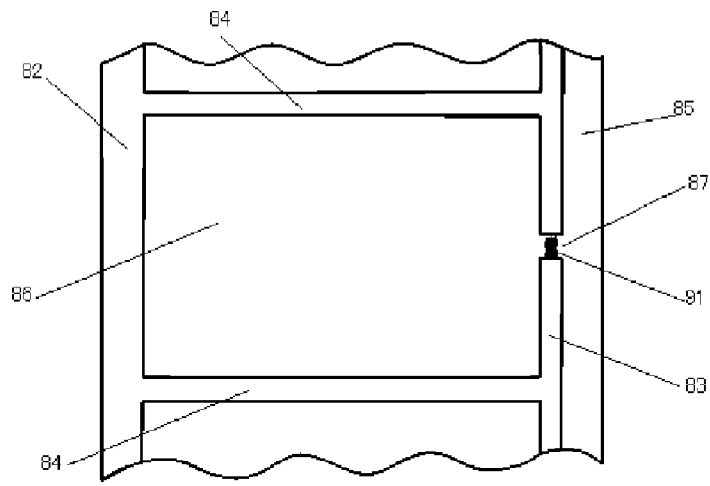
FIG. 5 is an enlarged view of the upper surface of the conventional metalized film.

Problems to be solved by the present disclosure are described with reference to FIG. 5 and FIG. 6. FIG. 5 is an enlarged view illustrating an upper surface of a conventional metalized film.

Due to formation of fuse 87, conventional metalized film 80 as described above can acquire self-protecting function. However, in the process of manufacturing metalized film 80 or in the process of manufacturing a film capacitor using metalized film 80, as shown in FIG. 5, crack 91 may occur in a portion of fuse 87. When a crack occurs in fuse 87, there exists a possibility that a function and performance of the film capacitor are adversely influenced by the crack, such as the lowering of operation accuracy of fuse 87 and the lowering of initial capacitance.

A situation that a crack occurs in fuse 87 of metalized film 80 in the process of manufacturing metalized film 80 or in the process of manufacturing a film capacitor is described below.

Metalized film 80 formed by forming metal vapor-deposited electrode 89 on a surface of dielectric film 81 has an elongated length of several thousand meters to several tens of thousands of meters and hence, in the process of manufacturing metalized film 80 or in the process of manufacturing a film capacitor using metalized film 80, metalized film 80 is continuously transferred by moving in the same direction as a rotating direction of rolls while being supported by the rolls installed in a manufacturing facility.

In such an operation, metalized film 80 is transferred in a state where metalized film 80 is once brought into contact with surfaces of the rolls, which support metalized film 80, thereafter, metalized film 80 is separated from the surfaces of the rolls. At the time that metalized film 80 is separated from the surfaces of the rolls, peeling electrification occurs in metalized film 80. The peeling electrification which occurs in metalized film 80 is grounded due to contacting of the metal vapor-deposited electrode of the metalized film with a metal portion such as the roll installed in the manufacturing facility. Then, a ground current flows in fuse 87, and a crack occurs in fuse 87 due to an electric current (the ground current) flowing in fuse 87.

As one example, the manner that a crack occurs in the process of manufacturing a metalized film using a vacuum vapor deposition device is described in detail.

Figure 6:
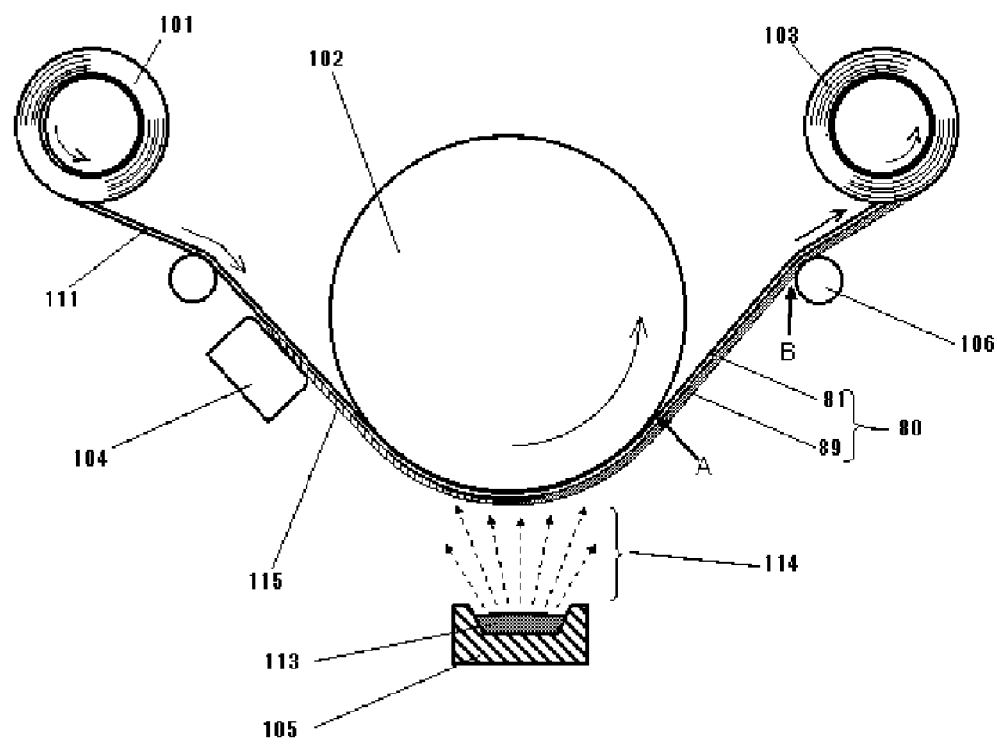
FIG. 6 is a view illustrating a state where a metalized film is manufactured using a vacuum vapor deposition device.

FIG. 6 is a view illustrating a state where a metalized film is manufactured using a vacuum vapor deposition device.

As shown in FIG. 6, dielectric film 111(81) which is wound in a roll shape before metal vapor-deposited electrode 89 is formed on a surface of dielectric film 111(81) is continuously reeled out from winding portion 101. Then, for forming an insulation margin and a slit where a vapor-deposited metal does not exist, oil 115 is applied to a surface of dielectric film 111(81) using oil nozzle 104 and, thereafter, on cooling roll 102 for cooling dielectric film 111(81) while supporting dielectric film 111(81), metal vapor 114 supplied from vapor source 113 with heating case 105 is brought into contact with dielectric film 111(81) so that metal particles are adhered to the surface of dielectric film 111(81) thus forming metal vapor-deposited electrode 89.

Metalized film 80 where metal vapor-deposited electrode 89 is formed on the surface of dielectric film 81 is wound in a roll shape by winding portion 103.

Figure 4:
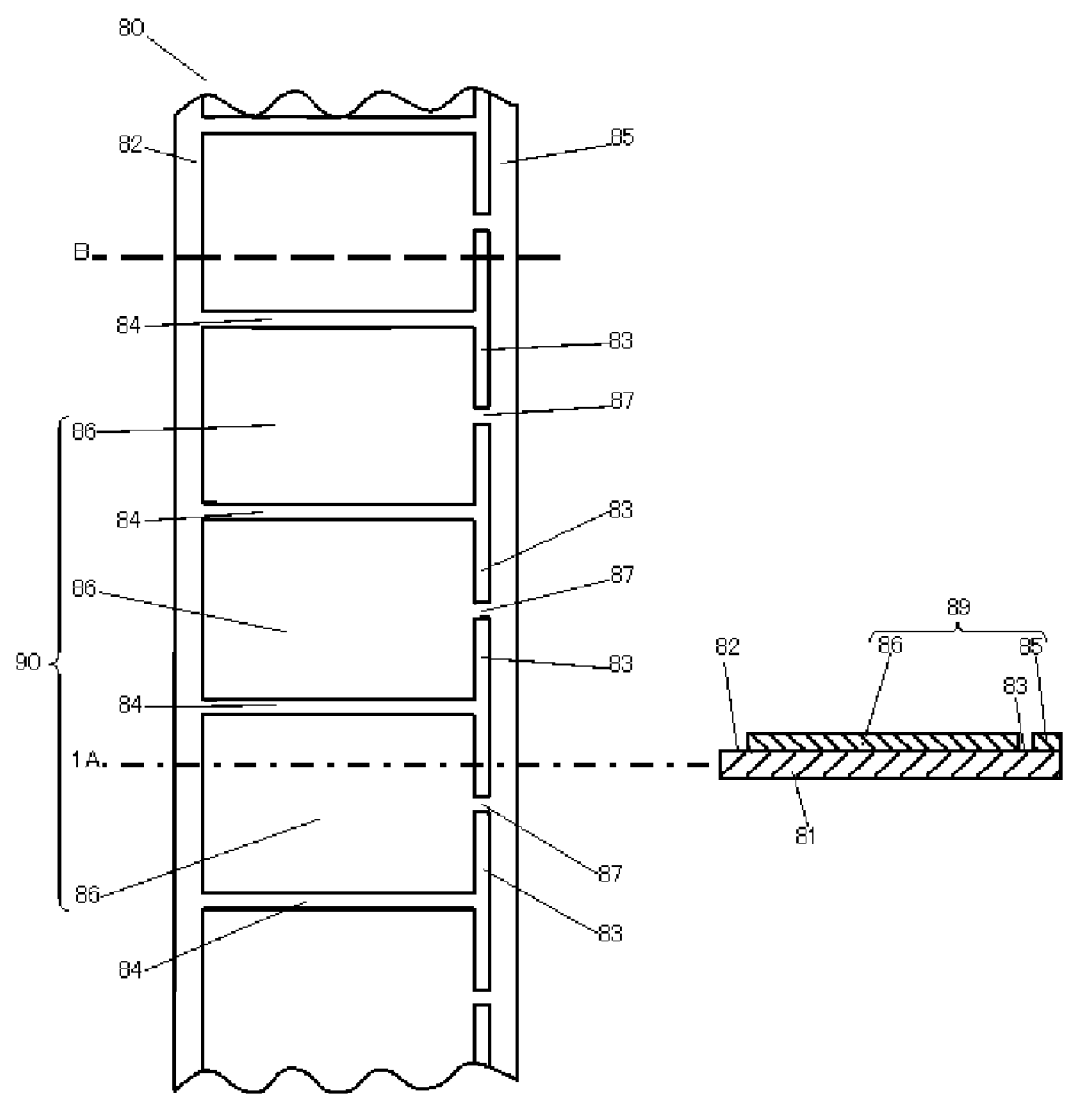
FIG. 4 is a view illustrating an upper surface and a cross section of a conventional metalized film.

Then, dielectric film 81 is transferred in a state where dielectric film 81 is once brought into contact with the surface of cooling roll 102. Metal vapor-deposited electrode 89 is formed on the surface of dielectric film 81 to form metalized film 80 and, thereafter, metalized film 80 is separated from the surface of cooling roll 102. At this time, peeling electrification attributed to separation between cooling roll 102 and metalized film 80 is generated in a peeling portion where cooling roll 102 and metalized film 80 are separated from each other in the whole width of the metalized film (a portion indicated by arrow A in FIG. 6, and a portion of the metalized film indicated by line 1A in FIG. 4). Then, as shown in FIG. 4, the peeling electrification is instantaneously conducted to first electrode 85 from divided electrode 86, in which the peeling portion exists, through fuse 87 connected to divided electrode 86. And, then, it is grounded from first electrode 85 to a metal portion such as roll 106 (a portion indicated by arrow B in FIG. 6, a portion of the metalized film indicated by line B in FIG. 4) which is brought into contact with first electrode 85. Then, peeling electrification which is continuously generated in metalized film 80 over the whole width of metalized film 80 continuously flows in one fuse 87 mounted on one divided electrode and is grounded, so that crack 91 occurs in fuse 87.

An exemplary embodiment of the present disclosure will now be described with reference to the attached drawings. The scope of the present disclosure, however, should not be limited to the exemplary embodiment.

First Exemplary Embodiment

Figure 1:
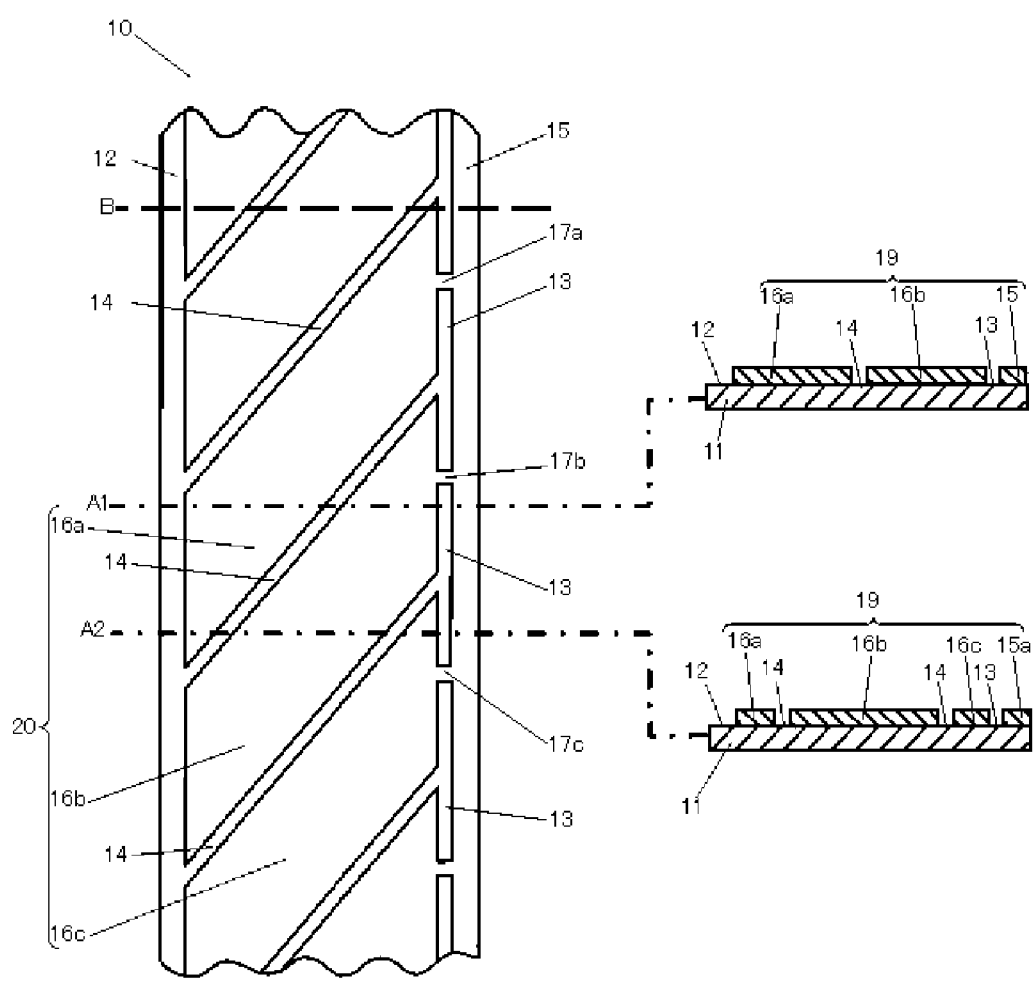
FIG. 1 is a view illustrating an upper surface and a cross section of a metalized film according to a first exemplary embodiment.

FIG. 1 is a view illustrating an upper surface and a cross section of a metalized film according to a first exemplary embodiment of the present disclosure.

As shown in FIG. 1, metalized film 10 is formed such that metal vapor-deposited electrode 19 is formed on a surface of dielectric film 11 excluding portions corresponding to insulation margin 12, first slits 13 and second slits 14. Thus, vapor-deposited metal does not exist in insulation margin 12, first slits 13 and second slits 14. Dielectric film 11 has a strip shape, and in the description made hereinafter, a direction along which the strip shape is elongated is referred to as a longitudinal direction, and a direction substantially perpendicular to the longitudinal direction is referred to as a width direction.

Insulation margin 12 is formed in a strip shape extending in the longitudinal direction of metalized film 10 at one end portion in the width direction of metalized film 10.

First slit 13 is formed in a strip shape extending in the longitudinal direction of metalized film 10 at a portion close to the other end portion in the width direction of metalized film 10. By first slit 13, metal vapor-deposited electrode 19 is divided into first electrode 15 and second electrode 20. First electrode 15 is disposed at a side close to the other end portion of metalized film 10 with respect to first slit 13, and second electrode 20 is disposed at a side close to one end portion of metalized film 10 with respect to first slit 13.

First electrode 15 is a portion for electrically connecting to a metallikon electrode when a capacitor element is formed by winding or stacking metalized film 10.

Second slit 14 is extending in an oblique direction with respect to the width direction of metalized film 10, and is formed in a straight line shape extending from insulation margin 12 to first slit 13.

Second electrode 20, which is provided at a side close to one end portion, is divided by second slits 14 into a plurality of divided electrodes 16a, 16b, 16c arranged in the longitudinal direction of metalized film 10.

Divided electrodes 16a, 16b, 16c are connected to first electrode 15 through fuses 17a, 17b, 17c, respectively, each of fuses 17a, 17b, 17c being disposed between a corresponding pair of first slits 13.

When metalized film 10 is cut along line A1 shown in FIG. 1, that is, metalized film 10 is cut along the width direction of metalized film 10, two divided electrodes arranged in the longitudinal direction of metalized film 10, that is, divided electrode 16a and divided electrode 16b, are respectively cut into pieces at line A1.

When metalized film 10 is cut along line A2 shown in FIG. 1, that is, metalized film 10 is cut at a position displaced from the position of line A1 described above in the longitudinal direction of metalized film 10, three divided electrodes which are arranged in the longitudinal direction of metalized film 10, that is, divided electrode 16a, divided electrode 16b, and divided electrode 16c, are respectively cut into pieces at line A2.

As described above, metalized film 10 is configured such that, when metalized film 10 is cut along the width direction of metalized film 10, two or more divided electrodes arranged in the longitudinal direction of metalized film 10 are always cut into pieces, respectively.

By configuring metalized film 10 as described above, the occurrence of a crack in the fuses formed on metalized film 10 in the process of manufacturing metalized film 10 or in the process of manufacturing the film capacitor using metalized film 10 can be suppressed.

The effect of the present disclosure when metalized film 10 according to this exemplary embodiment is conveyed in a state where metalized film 10 is supported on a roll installed in the manufacturing facility or the like, and metalized film 10 is separated from the roll which supports metalized film 10 is described in detail with reference to FIG. 1.

Line A1 shown in FIG. 1 indicates a peeling portion at which metalized film 10 is peeled from the roll which supports metalized film 10. And peeling electrification is generated at the portion of metalized film 10 indicated by line A1 over the whole width of metalized film 10. With respect to the generated peeling electrification, an electric current instantaneously flows to first electrode 15 from divided electrodes 16a, 16b where the peeling portion exists through fuses 17a, 17b respectively connected to divided electrodes 16a, 16b. Further, the peeling electrification is grounded to the metal portion (indicated by line B shown in FIG. 1) such as the roll which is brought into contact with the first electrode from first electrode 15.

That is, when the peeling electrification generated at the portion of metalized film 10 indicated by line A1 over the whole width of metalized film 10 is grounded, an electric current flows to first electrode 15 from two divided electrodes 16a, 16b existing in the peeling portion where peeling electrification is generated through two fuses 17a, 17b, which are connected to two divided electrodes 16a, 16b on a one-to-one basis.

In this manner, an electric current flows in a divided manner through two fuses 17a, 17b when peeling electrification generated over the whole width of metalized film 10 is grounded. Hence, an amount of the electric current which flows in each one of the fuses can be reduced. As a result, the occurrence of a crack in fuses 17a, 17b can be suppressed.

When line A2 shown in FIG. 1 indicates a peeling portion at which metalized film 10 is separated from the roll (not shown), peeling electrification is generated at the portion indicated by line A2 over the whole width of metalized film 10. With respect to the generated peeling electrification, an electric current instantaneously flows to first electrode 15 from divided electrodes 16a, 16b, 16c where the peeling portion exists through fuses 17a, 17b, 17c, which are respectively connected to divided electrodes 16a, 16b, 16c. Further, the generated peeling electrification is grounded from first electrode 15 to the metal portion (indicated by line B in FIG. 1) such as the roll which is brought into contact with first electrode 15.

That is, when peeling electrification generated at the portion of metalized film 10 indicated by line A2 over the whole width of metalized film 10 is grounded, an electric current flows to first electrode 15 from three divided electrodes 16a, 16b, 16c existing in the peeling portion where peeling electrification is generated through three fuses 17a, 17b, 17c, which are connected to three divided electrodes 16a, 16b, 16c on a one-to-one basis.

In this manner, an electric current flows in a divided manner through three fuses 17a, 17b, 17c when peeling electrification generated over the whole width of metalized film 10 is grounded. Hence, an amount of the electric current which flows in each one of the fuses can be reduced. As a result, the occurrence of a crack in fuses 17a, 17b, 17c can be suppressed.

That is, when metalized film 10 is cut at an arbitrary portion in the longitudinal direction of metalized film 10, two or more divided electrodes among the divided electrodes arranged in the longitudinal direction of metalized film 10 are always cut into pieces, respectively. Hence, two or more divided electrodes always exist at the peeling portion at which metalized film 10 is separated from the roll (corresponding to the cutting line), whereby the occurrence of a crack in fuses 17a, 17c, 17b respectively provided between first slits 13 of metalized film 10 can be suppressed.

In this exemplary embodiment, it is preferable that the number of divided electrodes to be cut at one line is set to four or less. When the number of divided electrodes to be cut is set to five or more, tan 8 is increased so that characteristic of the film capacitor is adversely influenced by the divided electrodes.

In this exemplary embodiment, second slit 14 is extending in oblique direction with respect to the width direction of metalized film 10, and is formed in a straight line over a range from insulation margin 12 to first slit 13. Thus whole second slit 14 is constituted by an oblique portion.

With such a configuration, when the peeling portion, at which the roll and the metalized film 10 are separated from each other, moves in the longitudinal direction of metalized film 10 along with the movement of metalized film 10, a length, in the width direction, of the divided electrode which is brought into contact with the peeling portion is short at a point of time that the peeling portion reaches an area in the vicinity of a front end of the divided electrode, which is an area in the vicinity of an intersecting point between the oblique portion of second slit 14 and insulation margin 12 or an intersecting point between the oblique portion of second slit 14 and first slit 13. Hence, an electric current which flows in the fuse from the divided electrode becomes extremely small. As the peeling portion moves toward a rear end of the divided electrode from the area in the vicinity of the front end of the divided electrode, a length, in the width direction, of the divided electrode is gradually increased, so that an electric current which flows in the fuse from the divided electrode is gradually increased.

Since the oblique portion is formed in a straight line, the length, in the width direction, of one divided electrode at the peeling portion is unlikely to be rapidly changed when the peeling portion, at which the roll and metalized film 10 are separated from each other, moves in the longitudinal direction of metalized film 10 along with the movement of metalized film 10. Thus, an electric current which flows in the fuse from the divided electrode is unlikely to be rapidly increased.

As described above, in the configuration of this exemplary embodiment, a change in magnitude of an electric current which flows in the fuse from one divided electrode by peeling electrification can be made gentle. Hence, an effect of suppressing the occurrence of a crack in the fuse can be increased.

As the dielectric film for forming the metalized film of this exemplary embodiment, a plastic film made of polypropylene, polyethylene terephthalate, polyethylene naphthalate, polyphenylene sulfide or the like, which has a thickness ranging from 1.5 µm to 10 µm, inclusive, can be used.

As a material for forming the metal vapor-deposited electrode, aluminum, an alloy of aluminum and zinc, an alloy of aluminum and magnesium or the like can be used. The metal vapor-deposited electrode preferably has a thickness ranging from 0.01 µm to 0.05 µm, inclusive.

As a method for manufacturing the metalized film, a vapor deposition method, a sputtering method, an ion plating method or the like is applicable.

Second Exemplary Embodiment

Figure 2:
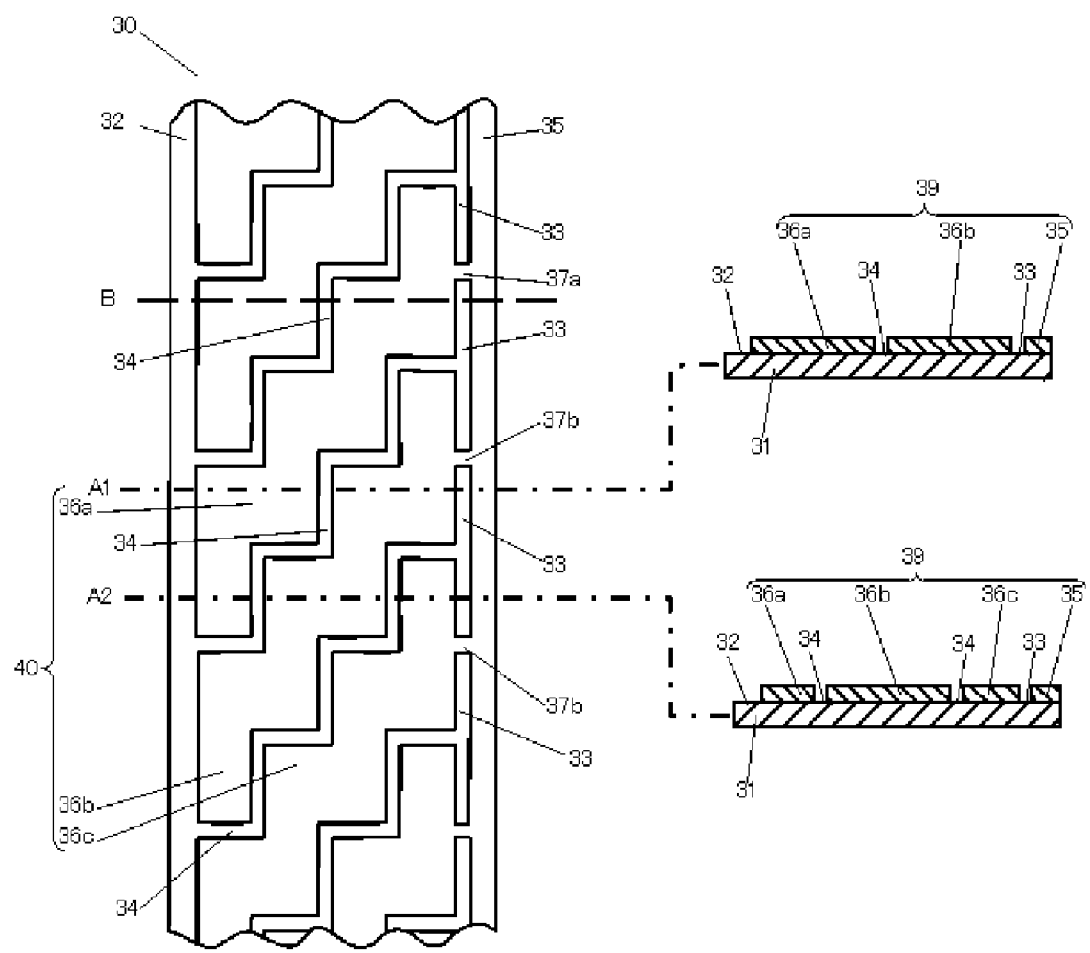
FIG. 2 is a view illustrating an upper surface and a cross section of a metalized film according to a second exemplary embodiment.

FIG. 2 is a view illustrating an upper surface and a cross section of a metalized film according to a second exemplary embodiment of the present disclosure.

As shown in FIG. 2, metalized film 30 is formed such that metal vapor-deposited electrode 39 is formed on a surface of dielectric film 31 excluding portions corresponding to insulation margin 32, first slits 33 and second slits 34. Thus, vapor-deposited metal does not exist in insulation margin 32, first slits 33 and second slits 34.

Insulation margin 32 is formed in a strip shape extending in a longitudinal direction of metalized film 30 at one end portion in a width direction of metalized film 30.

First slit 33 is formed in a strip shape extending in the longitudinal direction of metalized film 30 at a portion close to the other end portion in the width direction of metalized film 30. By first slit 33, metal vapor-deposited electrode 39 is divided into first electrode 35 and second electrode 40. First electrode 35 is disposed at a side close to the other end portion of metalized film 30 with respect to first slit 33, and second electrode 40 is disposed at a side close to one end portion of metalized film 30 with respect to first slit 33.

First electrode 35 is a portion for electrically connecting to a metallikon electrode when a capacitor element is formed by winding or stacking metalized film 30.

Second slit 34 is provided in a stepped manner extending from insulation margin 32 to first slit 33.

Second electrode 40, which is provided at a side close to one end portion, is divided by second slits 34 into a plurality of divided electrodes 36a, 36b, 36c arranged in the longitudinal direction of metalized film 30.

Divided electrodes 36a, 36b, 36c are connected to first electrode 35 through fuses 37a, 37b, 37c, respectively, each of fuses 37a, 37b, 37c being disposed between a corresponding pair of first slits 33.

When metalized film 30 is cut along line A1 shown in FIG. 2, that is, metalized film 30 is cut along the width direction of metalized film 30, two divided electrodes arranged in the longitudinal direction of metalized film 30, that is, divided electrode 36a and divided electrode 36b, are respectively cut into pieces at line A1.

When metalized film 30 is cut along line A2 shown in FIG. 2, that is, metalized film 30 is cut at a position displaced from the position of line A1 described above in the longitudinal direction of metalized film 30, three divided electrodes which are arranged in the longitudinal direction of metalized film 30, that is, divided electrode 36a, divided electrode 36b, and divided electrode 36c, are respectively cut into pieces at line A2.

As described above, metalized film 30 is configured such that, when metalized film 30 is cut along the width direction of metalized film 30, two or more divided electrodes arranged in the longitudinal direction of metalized film 30 are always cut into pieces, respectively.

By configuring metalized film 30 as described above, the occurrence of a crack in the fuses formed on metalized film 30 in the process of manufacturing metalized film 30 or in the process of manufacturing a film capacitor using metalized film 30 can be suppressed.

The effect of the present disclosure when metalized film 30 according to this exemplary embodiment is conveyed in a state where metalized film 30 is supported on a roll installed in a manufacturing facility or the like, and metalized film 30 is separated from the roll which supports metalized film 30 is described in detail with reference to FIG. 2.

Line A1 shown in FIG. 2 indicates a peeling portion at which metalized film 30 is peeled from the roll which supports metalized film 30. And peeling electrification is generated at a portion of metalized film 30 indicated by line A1 over the whole width of metalized film 30. With respect to the generated peeling electrification, an electric current instantaneously flows in first electrode 35 from divided electrodes 36a, 36b where the peeling portion exists through fuses 37a, 37b respectively connected to divided electrodes 36a, 36b. Further, the generated peeling electrification is grounded to the metal portion (indicated by line B shown in FIG. 2) such as the roll which is brought into contact with first electrode 35 from first electrode 35.

That is, when peeling electrification generated at the portion of metalized film 30 indicated by line A1 over the whole width of metalized film 10 is grounded, an electric current flows to first electrode 35 from two divided electrodes 36a, 36b existing in the peeling portion where peeling electrification is generated through two fuses 37a, 37b, which are connected to two divided electrodes 36a, 36b on a one-to-one basis.

In this manner, an electric current flows in a divided manner through two fuses 37a, 37b when peeling electrification generated over the whole width of metalized film 30 is grounded. Hence, an amount of the electric current which flows in each one of the fuses can be reduced. As a result, the occurrence of a crack in fuses 37a, 37b can be suppressed.

When line A2 shown in FIG. 2 indicates a peeling portion at which metalized film 30 is separated from the roll (not shown), peeling electrification is generated at the portion indicated by line A2 over the whole width of metalized film 30. With respect to the generated peeling electrification, an electric current instantaneously flows to first electrode 35 from divided electrodes 36a, 36b, 36c where the peeling portion exists through fuses 37a, 37b, 37c, which are respectively connected to divided electrodes 36a, 36b, 36c. Further, the generated peeling electrification is grounded from first electrode 35 to the metal portion (indicated by line B in FIG. 2) such as the roll which is brought into contact with first electrode 35.

That is, when peeling electrification generated at the portion of metalized film 30 indicated by line A2 over the whole width of metalized film 30 is grounded, an electric current flows to first electrode 35 from three divided electrodes 36a, 36b, 36c existing in the peeling portion where peeling electrification is generated through three fuses 37a, 37b, 37c, which are connected to three divided electrodes 36a, 36b, 36c on a one-to-one basis.

In this manner, an electric current flows in a divided manner through three fuses 37a, 37b, 37c when peeling electrification generated over the whole width of metalized film 30 is grounded. Hence, an amount of the electric current which flows in each one of the fuses can be reduced. As a result, the occurrence of a crack in fuses 37a, 37b, 37c can be suppressed.

Third Exemplary Embodiment

Figure 3:
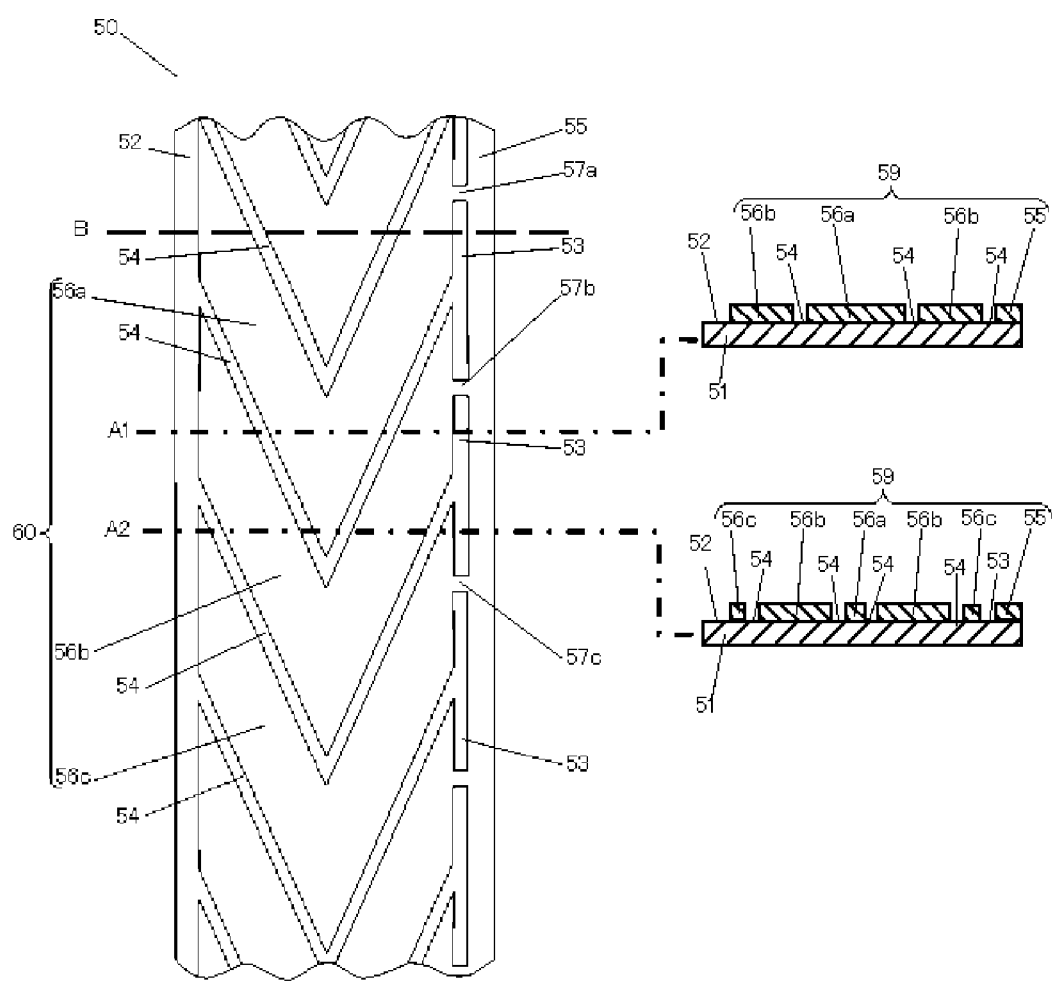
FIG. 3 is a view illustrating an upper surface and a cross section of a metalized film according to a third exemplary embodiment.

FIG. 3 is a view illustrating an upper surface and a cross section of a metalized film according to a third exemplary embodiment of the present disclosure.

As shown in FIG. 3, metalized film 50 is formed such that metal vapor-deposited electrode 59 is formed on a surface of dielectric film 51 excluding portions corresponding to insulation margin 52, first slits 53 and second slits 54. Thus, vapor-deposited metal does not exist in insulation margin 52, first slits 53 and second slits 54.

Insulation margin 52 is formed in a strip shape extending in a longitudinal direction of metalized film 50 at one end portion in a width direction of metalized film 50.

First slit 53 is formed in a strip shape extending in the longitudinal direction of metalized film 50 at a portion close to the other end portion in the width direction of metalized film 50. By first slit 53, metal vapor-deposited electrode 59 is divided into first electrode 55 and second electrode 60. First electrode 55 is disposed at a side close to the other end portion of metalized film 50 with respect to first slit 53, and second electrode 60 is disposed at a side close to one end portion of metalized film 50 with respect to first slit 53.

First electrode 55 is a portion for electrically connecting to a metallikon electrode when a capacitor element is formed by winding or stacking metalized film 50.

Second slit 54 is provided in a V-shape extending from insulation margin 52 to first slit 53.

Second electrode 60, which is provided at a side close to one end portion, is divided by second slits 54 into a plurality of divided electrodes 56a, 56b, 56c arranged in the longitudinal direction of metalized film 50.

Divided electrodes 56a, 56b, 56c are connected to first electrode 55 through fuses 57a, 57b, 57c, respectively, each of fuses 57a, 57b, 57c being disposed between a corresponding pair of first slits 53.

When metalized film 50 is cut along line A1 shown in FIG. 3, that is, metalized film 50 is cut along the width direction of metalized film 50, two divided electrodes arranged in the longitudinal direction of metalized film 50, that is, divided electrode 56a and divided electrode 56b, are respectively cut into pieces at line A1.

When metalized film 50 is cut along line A2 shown in FIG. 3, that is, metalized film 50 is cut at a position displaced from the position of line A1 described above in the longitudinal direction of metalized film 50, three divided electrodes which are arranged in the longitudinal direction of metalized film 50, that is, divided electrode 56a, divided electrode 56b, and divided electrode 56c, are respectively cut into pieces at line A2.

As described above, metalized film 50 is configured such that, when metalized film 50 is cut along the width direction of metalized film 50, two or more divided electrodes arranged in the longitudinal direction of metalized film 50 are always cut into pieces, respectively.

By configuring metalized film 50 as described above, the occurrence of a crack in the fuses formed on metalized film 50 in the process of manufacturing metalized film 50 or in the process of manufacturing a film capacitor using metalized film 50 can be suppressed.

The effect of the present disclosure when metalized film 50 according to this exemplary embodiment is conveyed in a state where metalized film 50 is supported on a roll installed in a manufacturing facility or the like, and metalized film 50 is separated from the roll which supports metalized film 50 is described in detail with reference to FIG. 3.

Line A1 shown in FIG. 3 indicates a peeling portion at which metalized film 50 is peeled from the roll which supports metalized film 50. And peeling electrification is generated at the portion of metalized film 50 indicated by line A1 over the whole width of metalized film 50. With respect to the generated peeling electrification, an electric current instantaneously flows in first electrode 55 from divided electrodes 56a, 56b where the peeling portion exists through fuses 57a, 57b respectively connected to divided electrodes 56a, 56b. Further, the generated peeling electrification is grounded from first electrode 55 to the metal portion (indicated by line B shown in FIG. 3) such as the roll which is brought into contact with first electrode 55.

That is, when peeling electrification generated at the portion of metalized film 50 indicated by line A1 over the whole width of metalized film 50 is grounded, an electric current flows to first electrode 55 from two divided electrodes 56a, 56b existing in the peeling portion where peeling electrification is generated through two fuses 57a, 57b, which are connected to two divided electrodes 56a, 56b on a one-to-one basis.

In this manner, an electric current flows in a divided manner through two fuses 57a, 57b when peeling electrification generated over the whole width of metalized film 50 is grounded. Hence, an amount of the electric current which flows in each one of the fuses can be reduced. As a result, the occurrence of a crack in fuses 57a, 57b can be suppressed.

When line A2 shown in FIG. 3 indicates a peeling portion at which metalized film 50 is separated from the roll (not shown), peeling electrification is generated at the portion indicated by line A2 over the whole width of metalized film 50. With respect to the generated peeling electrification, an electric current instantaneously flows to first electrode 55 from divided electrodes 56a, 56b, 56c where the peeling portion exists through fuses 57a, 57b, 57c, which are respectively connected to divided electrodes 56a, 56b, 56c. Further, the generated peeling electrification is grounded from first electrode 55 to the metal portion (indicated by line B in FIG. 3) such as the roll which is brought into contact with first electrode 55.

That is, when peeling electrification generated at the portion of metalized film 50 indicated by line A2 over the whole width of metalized film 50 is grounded, an electric current flows to first electrode 55 from three divided electrodes 56a, 56b, 56c existing in the peeling portion where peeling electrification is generated through three fuses 57a, 57b, 57c which are connected to three divided electrodes 56a, 56b, 56c on a one-to-one basis.

In this manner, an electric current flows in a divided manner through three fuses 57a, 57b, 57c when peeling electrification generated over the whole width of metalized film 50 is grounded. Hence, an amount of the electric current which flows in each one of the fuses can be reduced. As a result, the occurrence of a crack in fuses 57a, 57b, 57c can be suppressed.

With such a configuration, according to the present disclosure, a metalized film where the occurrence of a crack in a fuse can be suppressed can be obtained. A film capacitor which is manufactured using such a metalized film can possess a self-protecting function exhibiting a highly accurate fuse operation.

As described above, the configuration of the metalized film according to the present disclosure is effective in the process of manufacturing a metalized film and in the process of manufacturing a film capacitor using a metalized film. Such a configuration is particularly effective in manufacturing a metalized film by a vacuum vapor-deposition method as described in the prior art. In the manufacture of a metalized film using a vacuum vapor deposition method, in order to prevent thermal deterioration of a dielectric film attributed to a latent heat of metal vapor generated or a radiant heat from an evaporation source when vapor-deposited metal is deposited on a dielectric film, electron beam is preliminarily irradiated to a dielectric film so that the dielectric film is charged, and heat is radiated from the dielectric film by bringing the dielectric film into close contact with a cooling roll. Since a charge remains on the metalized film, and the metalized film is brought into close contact with a cooling roll even after the dielectric film is formed into a metalized film by forming a metal vapor-deposited electrode on a surface of the charged dielectric film, peeling electrification generated when the metalized film is separated from the cooling roll becomes large. Accordingly, compared to manufacturing processes other than the vacuum vapor deposition, a large current flows in a fuse and hence, in a metalized film having the conventional configuration, a rate of occurrence of a crack in a fuse is increased. In contrast, according to the metalized film of the present disclosure, an electric current which flows in each one of the fuses can be reduced and hence, the rate of occurrence of a crack in a fuse can be reduced.

A film capacitor is manufactured as follows using a metalized film configured as described above. That is, the first metalized film including a first electrode, a first slit, a second electrode, and an insulation margin which are arranged in a width direction from one end portion of the metalized film, and the second metalized film including a first electrode, a first slit, a second electrode, and an insulation margin which are arranged in the width direction from the other end portion of the metalized film are wound in a laminating manner. And then, by applying metal spray to both ends of the wounded body, metallikon electrodes are formed. In this case, it is preferable that a fuse formed on the first metalized film and a fuse formed on the second metalized film are formed outside an effective electrode region where the electrode of the first metalized film and the electrode of the second metalized film face each other. If a fuse is formed within the effective electrode region, there exists a possibility that a so-called corrosion, which is a phenomenon that an edge of an electrode is retracted due to a corona discharge when a voltage is applied to a film capacitor, occurs. Thus a width of the fuse is gradually narrowed so that disconnection of the fuse may occur. For the same reason, it is preferable that a fuse is not formed in a second slit. The fuse formed in the second slit is usually positioned within the effective electrode region, and there exists a possibility that when a voltage is applied to a film capacitor, a width of the fuse is gradually narrowed so that disconnection of the fuse may occur.

The present disclosure is useful for metallized film capacitors used for various electric components of electronic devices, electric devices, industrial devices, vehicles or the like.

What is claimed is:

1. A metalized film comprising:
  a dielectric film having a strip-shape; and
  a metal vapor-deposited electrode which is formed on a surface of the dielectric film and contains vapor-deposited metal, wherein:
  an insulation margin where the vapor-deposited metal does not exist is provided on a first end portion of the dielectric film, the first end portion being located at one end in a width direction of the dielectric film, the insulation margin having a strip-shape that extends in a longitudinal direction of the dielectric film,
  a plurality of first slits where the vapor-deposited metal does not exist and a plurality of fuses are provided close to a second end portion of the dielectric film, each of the plurality of fuses being disposed between a corresponding pair of the plurality of first slits, the second end portion being located at an other end in the width direction of the dielectric film, the plurality of first slits each having a strip-shape that extends in the longitudinal direction of the dielectric film,
  the metal vapor-deposited electrode has a first electrode and a second electrode, the first electrode being disposed closer to the second end portion than the plurality of first slits, the second electrode being disposed closer to the first end portion than the plurality of first slits,
  the second electrode includes a plurality of divided electrodes which are separated by a corresponding one of a plurality of second slits where the vapor-deposited metal does not exist and are arranged in the longitudinal direction, each of the plurality of second slits extending from the insulation margin to a corresponding one of the plurality of first slits,
  each of the plurality of divided electrodes is connected to the first electrode through a corresponding one of the plurality of fuses,
  when the metalized film is cut along a cutting line extending in the width direction at any position in the longitudinal direction of the metalized film, at least two divided electrodes among the plurality of divided electrodes are respectively cut into pieces at the cutting line, the at least two divided electrodes being arranged in the longitudinal direction,
  when the metalized film is cut along a first cutting line extending in the width direction at a first position between both edges of each of the plurality of divided electrodes in the longitudinal direction of the metalized film, three divided electrodes among the plurality of divided electrodes are respectively cut into pieces at the first cutting line, the three divided electrodes being arranged in the longitudinal direction, and a length of each of the three divided electrodes at the first cutting line is greater than a length of the each of the plurality of fuses in the longitudinal direction of the metalized film.

2. The metalized film according to claim 1, wherein each of the plurality of second slits has an oblique portion which extends in an oblique direction with respect to the width direction.

3. The metalized film according to claim 2, wherein the oblique portion constitutes respective intersecting points with the insulation margin and the corresponding one of the plurality of first slits.

4. The metalized film according to claim 3, wherein each of the plurality of second slits is formed in a straight line extending from the insulation margin to the corresponding one of the plurality of first slits.

5. A film capacitor comprising the metalized film according to claim 1.

* * * * *